US006281597B1

(12) United States Patent
Obermeyer et al.

(10) Patent No.: US 6,281,597 B1
(45) Date of Patent: Aug. 28, 2001

(54) HYDROELECTRIC INSTALLATION AND METHOD OF CONSTRUCTING SAME

(75) Inventors: Henry K. Obermeyer, Wellington, CO (US); Thomas Dum, Salzburg; Wolfgang Sambs, Linz, both of (AT)

(73) Assignees: Syndicated Technologies, LLC., Aspen, CO (US); VA Tech Hydro GmbH & Co., Vienna (AT)

( * ) Notice: Subject to any disclaimer, the term of this patent is extended or adjusted under 35 U.S.C. 154(b) by 0 days.

(21) Appl. No.: 09/373,679

(22) Filed: Aug. 13, 1999

(51) Int. Cl.[7] .................................................. F03B 13/00
(52) U.S. Cl. ............................... 290/54; 290/43; 405/78
(58) Field of Search ................... 290/54, 52, 43; 405/78

(56) References Cited

U.S. PATENT DOCUMENTS

| 4,165,467 | * | 8/1979 | Atencio | 290/52 |
| 4,170,428 | * | 10/1979 | Atencio | 405/78 |
| 4,319,142 | * | 3/1982 | Mayo, Jr. | 290/52 |
| 4,755,690 | * | 7/1988 | Obermeyer | 290/52 |
| 4,804,855 | * | 2/1989 | Obermeyer | 290/54 |
| 5,825,094 | * | 10/1998 | Hess | 290/54 |

FOREIGN PATENT DOCUMENTS

| 2218742 | * | 11/1989 | (GB) . |
| 89/00646 | * | 1/1989 | (WO) . |
| 98/11343 | * | 3/1998 | (WO) . |

* cited by examiner

Primary Examiner—Joseph Waks

(57) ABSTRACT

A hydroelectric power installation including a pre-existing gated spillway with upstream bulkhead slots and bulkhead service crane and hydroelectric generating modules configured to fit the existing upstream bulkhead slots. Each module including a plurality of turbines, generators, and associated switchgear. The installation may include a trash rake operated on the pre-existing bulkhead service craneway. The hydroelectric installation is configured to meet all of the original navigation project design criteria including generating modules that can be raised above flood water as high as the associated radial gates and that are able to be safely lowered in front of a failed radial gate to serve as the emergency bulkhead the slots for which the modules exclusively occupy.

17 Claims, 18 Drawing Sheets

HYDROELECTRIC INSTALLATION AND METHOD OF CONSTRUCTING SAME

FIELD OF THE INVENTION

The present invention relates to hydroelectric generating apparatus and the method of installing the same. More specifically this invention relates to the retrofitting of hydroelectric generating apparatus to pre-existing gated spillways typically found at navigation locks and dams such as those on the Ohio River, USA.

DESCRIPTION OF RELATED ART

Hydroelectric power installations utilizing turbine generator sets that are lowered into or raised from their operating position are known. For example, U.S. Pat. Nos. 4,143,990 and 4,207,015 to F. J. Atencio disclose different versions of movable hydroelectric generator sets. U.S. Pat. No. 4,289,971 to Ueda discloses a turbine generator unit that may be raised or lowered for attachment to a fixed draft tube. U.S. Pat. No. 4,319,142 to Mayo discloses a hydraulic turbine installation which is movable between an operating position and a raised flood passing position, but which cannot, due to it's length, be raised high enough to clear debris during a flood event. Furthermore, due to its very heavy weight, it could not be raised with the crane which pre-exists at many of the potential projects.

U.S. Pat. No. 4,755,690 to Obermeyer discloses a hydroelectric generating module which can be raised or lowered in front of a pre-existing outlet gate on a dam.

U.S. Pat. No. 4,804,855 to Obermeyer discloses a matrix of hydromotive machines which may be hydraulic turbine generator sets. A shortcoming of these designs is that they fail to disclose any means of reducing the number of cables connected to the modules.

U.S. Pat. No. 5,825,094 to Hess discloses a hydroelectric generating module which could theoretically be raised or lowered into a bulkhead slot. A shortcoming of this design is that lowering or raising of the module under flow conditions, as may be required in an emergency, would require lifting forces beyond the capacity of the pre-existing crane system. The down pull is due to the bottom horizontal and near horizontal surfaces of the water inlet tubes, which are subject to full head pressure on their upper surfaces and are subject to a much lower pressure on their lower surfaces due to the high velocity of the water passing under the unit with the module partially raised. The flap valves for controlling the flow through the turbines would interfere with the pre-existing radial gate normally located a very short distance downstream from the pre existing stop log slot. This interference, which could occur in both the partially raised position as well as the lowered operating position, would require that the module be installed too far upstream to utilize the existing bulkhead service crane. Further disadvantages of this design are the small trash rack area that would result in low overall efficiency and the lack of trash handling means that would result in frequent plant outages due to floating debris. Yet a further disadvantage of this design is extra weight of the totally superfluous water passageways upstream of the turbine distributors, a feature which reduces hydraulic efficiency by preventing any reduction in the already high trash rack velocities when some of the units are shut down. Yet a further disadvantage of this design is that the bottom horizontal member of the water passageway extends so far upstream that if the module were used as an emergency closure device, the resulting hydraulic down pull could damage or destroy the crane system. Yet a further disadvantage of this design is the lack of integrity of the draft tube assembly which would be subject to damage by vibration, ice and debris while contributing nothing to the strength of the structure as a whole.

PCT International publication number WO 98/11343 to Winkler discloses an array of turbine generator sets which may be lifted independently of the draft tubes. Such an arrangement is not applicable to the large US navigation locks and dams which require that all equipment including draft tubes be raised to pass high flows.

SUMMARY OF THE INVENTION

In accordance with the present invention, there is provided a hydroelectric generating module comprised of the following components; One or more turbine generator sets, a plurality of water passageways comprising a lower portion of the bulkhead, and an upper water retaining structural portion of the bulkhead. The module is installed by increasing the height of the existing crane, and providing on the crane rails of said pre-existing crane a trash rake which may be used to clear debris from the screens in front of the turbine generators as well as used as a control location to start and stop individual turbine generating sets and operate a trash gate mounted along the top edge of the module.

According to another aspect of the invention, the discharge of each vertical column of generators is controlled by a slide gate at the draft tube exit. Such draft tube gates are preferably operated by hydraulic cylinder within said gates thus leaving the space above the gates unobstructed for passage of trash.

According to another aspect of the invention, the upper portion of the module provides an accessible enclosure for electrical equipment while being short enough in the upstream/downstream direction to be raised up between the pre-existing crane way bridge girders to pass debris during maximum flood flows, while the lower portion of the module extends from near the radial gate at the downstream end as far upstream as center of gravity constraints permit, resulting in an economic runner size and excellent hydraulic efficiency. Said upper portion serves as an integral structural component of the module and contributes significantly to the strength of the module as a whole, especially during lifting.

According to a further aspect of the invention a vertical columnar structure is provided at each end of the module to provide access to the module from each end, to provide a lifting point, and to provide access and mounting means for retractable bulkhead slot wheels.

Yet another aspect of the invention is a means for discharging water in excess of turbine capacity in such a manner as to augment energy production. Such means may be a spillway gate at the top of the module or a roller gate, for example, discharging from an intermediate elevation, or a combination of both.

Yet another aspect of the invention is the provision of a lip or jump above the draft tube exits configured to direct excess flows over the draft tubes in a nearly horizontal or preferably slightly upward direction, thus causing a reduction in effective tailwater elevation and an increase in net head across the turbines.

Yet another aspect of the invention is an auxiliary lifting means which can be used to lift the module out of the spillway flow path if the main pre-existing crane is out of service. The auxiliary lifting means is so configured that it can be used to lift a module on either side of or underneath the pre-existing main lifting crane. Such lifting means may be hydraulic strand jacks, for example, mounted on a cart that can be lifted over the module lifting emergency bulkhead crane by the associated auxiliary crane or that can pass through or around the module lifting emergency bulkhead crane.

Yet another aspect of the invention is the location of a seal and flow separation edge across the bottom of the module from pier to pier so as to provide neither excess buoyancy nor excess down pull during use of the turbine module as an emergency closure device. Such a seal may be used in conjunction with an air vent downstream of said seal to prevent the formation of a vacuum and unstable flow conditions under the portion of the module downstream of the seal.

Yet another aspect of the invention is the inclination of the turbine generator units in the downstream direction. Said inclination creates a more uniform velocity distribution through the turbine resulting in improved efficiency and compensating for the lower plant cavitation coefficient associated with the slightly higher turbine setting. Said inclination also reduces the hydraulic down pull due to the vertical component of flow through the turbine intake area while the module is being lowered as an emergency shut off device.

Yet another aspect of the invention is the heightening of the existing crane system in combination with the provision of a narrow upper section of the generating module to allow the module to be raised between closely spaced preexisting crane girders.

Yet another aspect of the invention is the combination of a rigid upper bulkhead section comprised of one or more tubular sections in combination with the water passageway truss structure of the prior art. Such upper tubular section is well suited to resist in bending the gravity loads of the entire module during lifting operations and provides torsional rigidity about the horizontal axis normal to flow.

Yet another aspect of the invention is the placement of the switchgear and controls associated with each of the turbine generator units within one or more of said tubular structures, thus reducing the number of electrical cables which must be connected to the fixed concrete structure and which must articulate or be disconnected during vertical repositioning of the modules.

Yet another aspect of the invention is the provision of vertical tubular generating module structural members adjacent each spillway pier which serve as access passageways, means for securing of retractable wheels, ventilation ducts, electrical power conveyance ducts, and as abutments or bulkhead piers for the integral trash gate system. Such bulkhead piers may be extended a safe distance above normal upstream pool elevation to provide safe human access to and egress from the generating modules even under transient high water conditions, while allowing the remaining top surface of the module to function as a controlled or uncontrolled weir for discharge of water. Access portals into said bulkhead piers may be located on top of said bulkhead piers or on their downstream face or both.

Yet another aspect of the invention is the provision of a connection point and recess in the upstream face of said vertical tubular members or piers to facilitate proper drooping of the electrical cables upon raising of a module, while avoiding interference with the crane girders between which the pier must extend when fully raised, and resulting in the cables being away from the trash passing spillway portion of the module.

Yet another aspect of the invention is a mounting means such as flanges in association with each of the wheel spindles configured to allow positioning and fixing of the module guide wheels from within the vertical tubular structure. This feature permits offloading in the horizontal downstream direction a generating module from a spud barge for example, followed by extension into and securing within the wheel assemblies within the upstream bulkhead slots.

According to a further aspect of the invention a mechanical trash raking device is configured to utilize the preexisting crane rails and bus bars. Such trash raking device may be configured to include, for the use of the operator or automatic control system, means for starting and stopping individual or grouped turbine generator sets in order to reduce local water velocity and enhance raking effectiveness, and means for raising and lowering an integral trash gate in order to flush floating debris. Such raking device may be further configured to provide information regarding individual turbine output or inlet pressure to the operator or automatic controller in order to prioritize trash raking effort. Such raking device may be further configured to provide sonar information from a rake mounted, portable or stationary sonar imaging device to the operator or automatic controller.

Yet another aspect of the invention is a means of transferring to the pre-existing radial gate located downstream of the generating module the impact load of an errant shipping barge against a generating module. Such load transfer capability provides assurance that an accidental barge impact event does not deform a generating module and thereby obstruct the travel of the associated radial gate which could, in turn, cause a loss of the upstream navigation pool.

Yet another aspect of the invention is a tubular structural support extending from the equipment hallway downward to one or more turbines providing mechanical support to said turbines. Said tubular structural support may be used to contain and protect from the surrounding water the means of electrical or mechanical transmission from the turbines. Said tubular support may also be used to support the trash screen structure upstream of the turbines. Said tubular support may be fitted with means for transmitting loads directly to the underlying spillway sill. Said support means are preferably adjustable to allow fitting of a prefabricated module to the existing spillway sill.

Yet another aspect of the invention is a debris blocking means below the turbine intake that protects the turbines from debris while being lowered into position but allows flow in a downward direction when the module is being used as an emergency bulkhead to shut off flow. Such means may be a trash screen or an expendable or articulated flap which would block the upward flow of debris into the module intake during lowering but would not resist flow or transmit hydraulic down pull loads to the module.

DETAILED DESCRIPTION OF THE PREFERRED EMBODIMENTS

The provision of power installations at navigation dams without the need for coffer dams, excavation or new concrete structures can reduce costs by approximately half compared to conventional construction. Installations of the type described herein are subject to rigorous operational criteria including weight limitations imposed by the existing crane and craneway, lifting elevations E above flood water elevations F and lifting reliability dictated by flood conditions, as well as a requirement that any new equipment which occupies the bulkhead slots must perform the emergency shut off function of the bulkheads originally intended for the bulkhead slots and rendered unusable by the presence of the new generating modules.

As of the date of this patent application no movable array or matrix type turbine installations have ever been installed at the spillway of a navigation lock and dam in the United States due to the herein described challenging design criteria which this invention addresses in detail.

Figure 1:
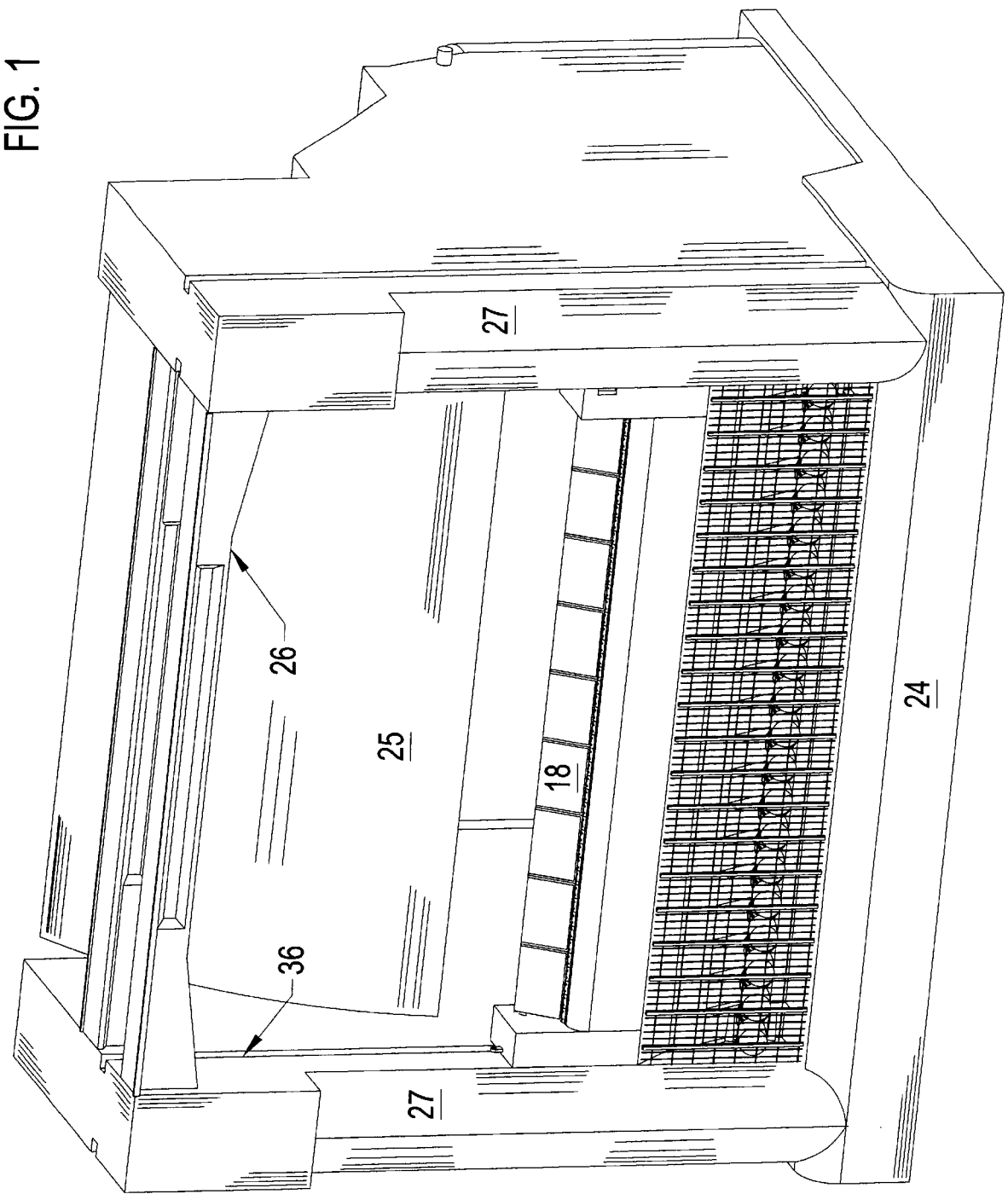
FIG. 1 is a perspective view of one bay of a gated spillway within which a generating module is shown in operating position and the associated preexisting radial gate in it's raised position. This is the normal power generating configuration.
Figure 2:
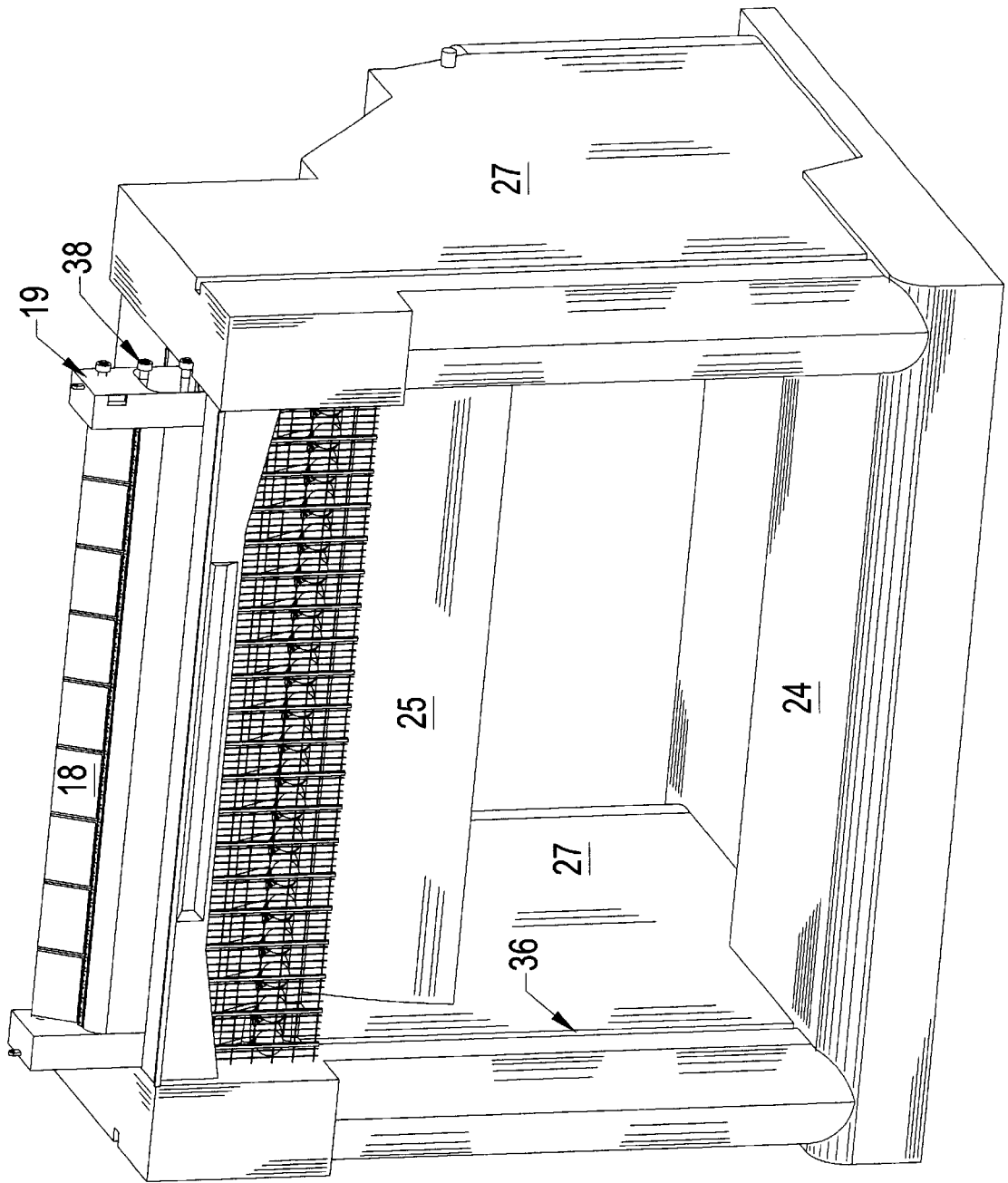
FIG. 2 is a perspective view of one bay of a gated spillway within which a generating module is shown in the raised position and the associated radial gate is shown in the raised position. This is the flood passing configuration.
Figure 3:
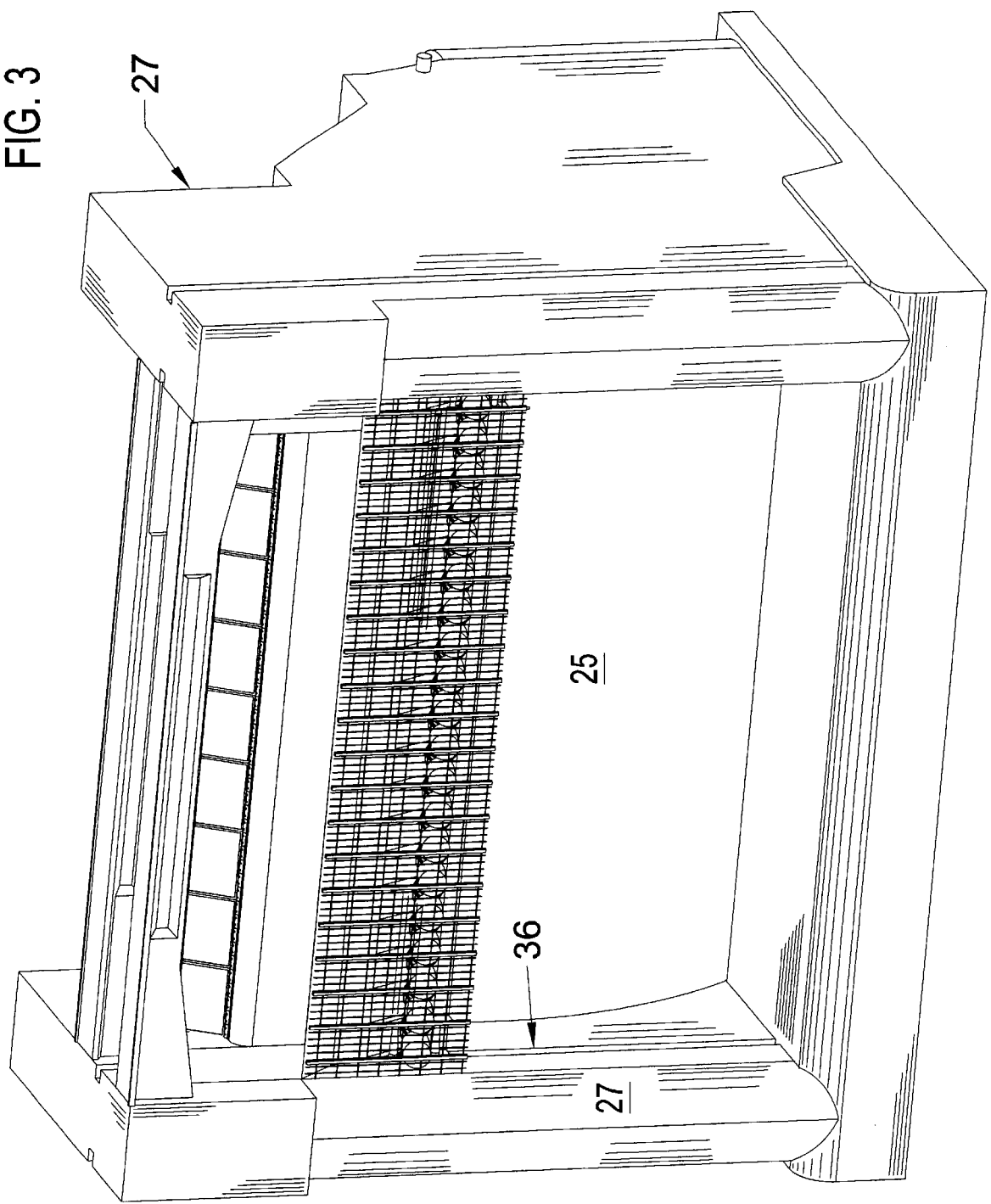
FIG. 3 is a perspective view of one bay of a gated spillway within which a generating module is in the raised position and the associated preexisting radial gate is in the lowered position. This configuration depicts the turbine service position during moderate water flow.
Figure 4:
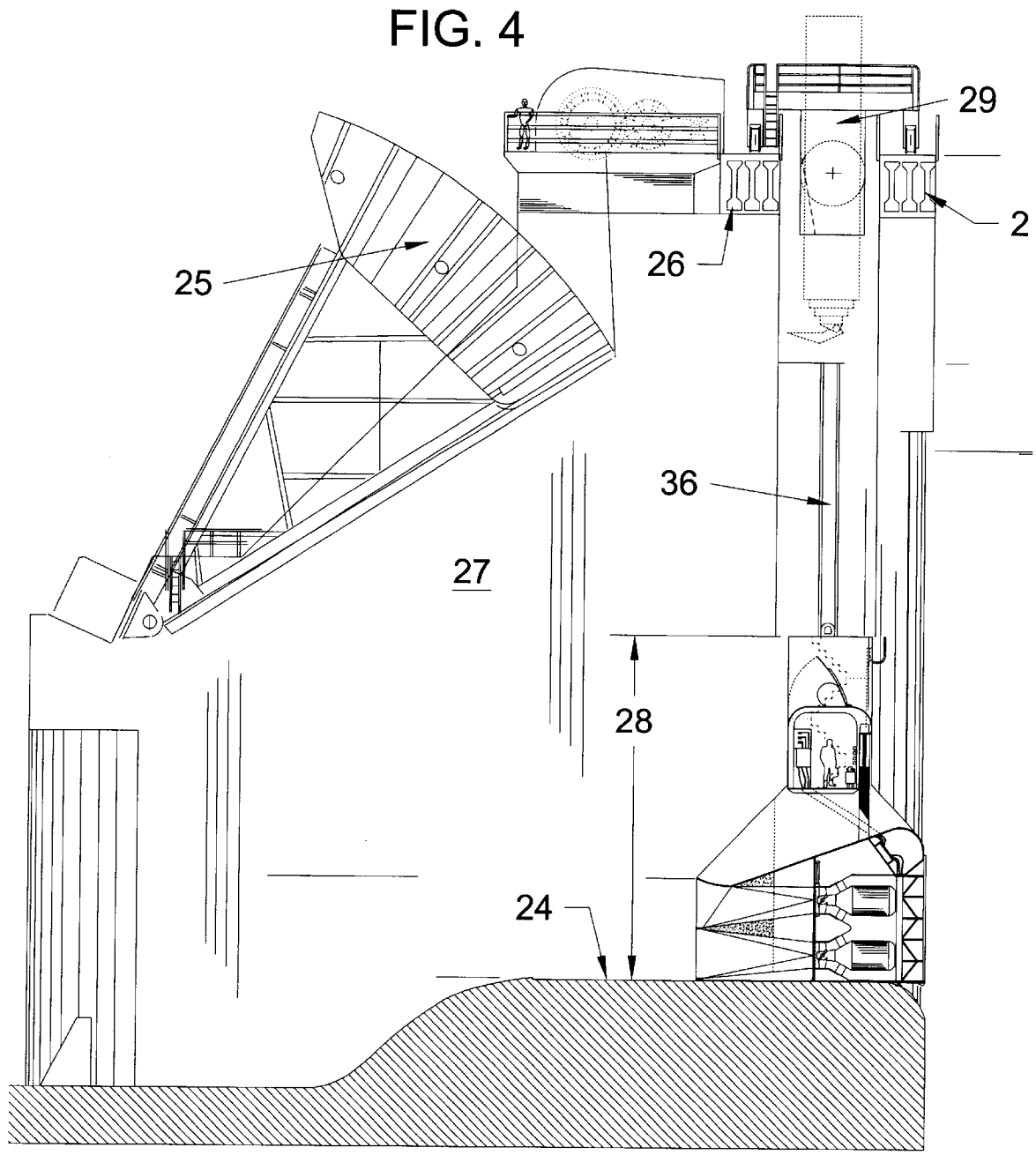
FIG. 4 is a cross section view showing a generating module (including a plurality of hydromotive machine, i.e. turbine generators in the lowered operating position and the associated radial gate raised. A mechanical trash rake is shown adapted to the preexisting craneway.

In many locations most of the trash which cannot pass through the turbines is floating. Even conventional power plants with large (7 or 8 meter runner diameter) pit or bulb type turbines with coarse trash screens can lose electrical generation due to debris blockage. Small turbines such as those associated with matrix or array arrangements have finer screens that are even more subject to trash blockage. The spillway gates 18 integral with the generating modules 28 disclosed herein eliminate the need to rake the floating debris, which can thus be simply passed over the top of the modules. A conventional trash rake 29 in its fully retracted position is shown in FIG. 4. In some cases the act of raking debris out of the water may result in a requirement that the plant operator remove the debris from the river then dispose of the debris at a land fill with certifications that it contains no hazardous waste, which could simply be pieces of pressure treated lumber.

Figure 5:
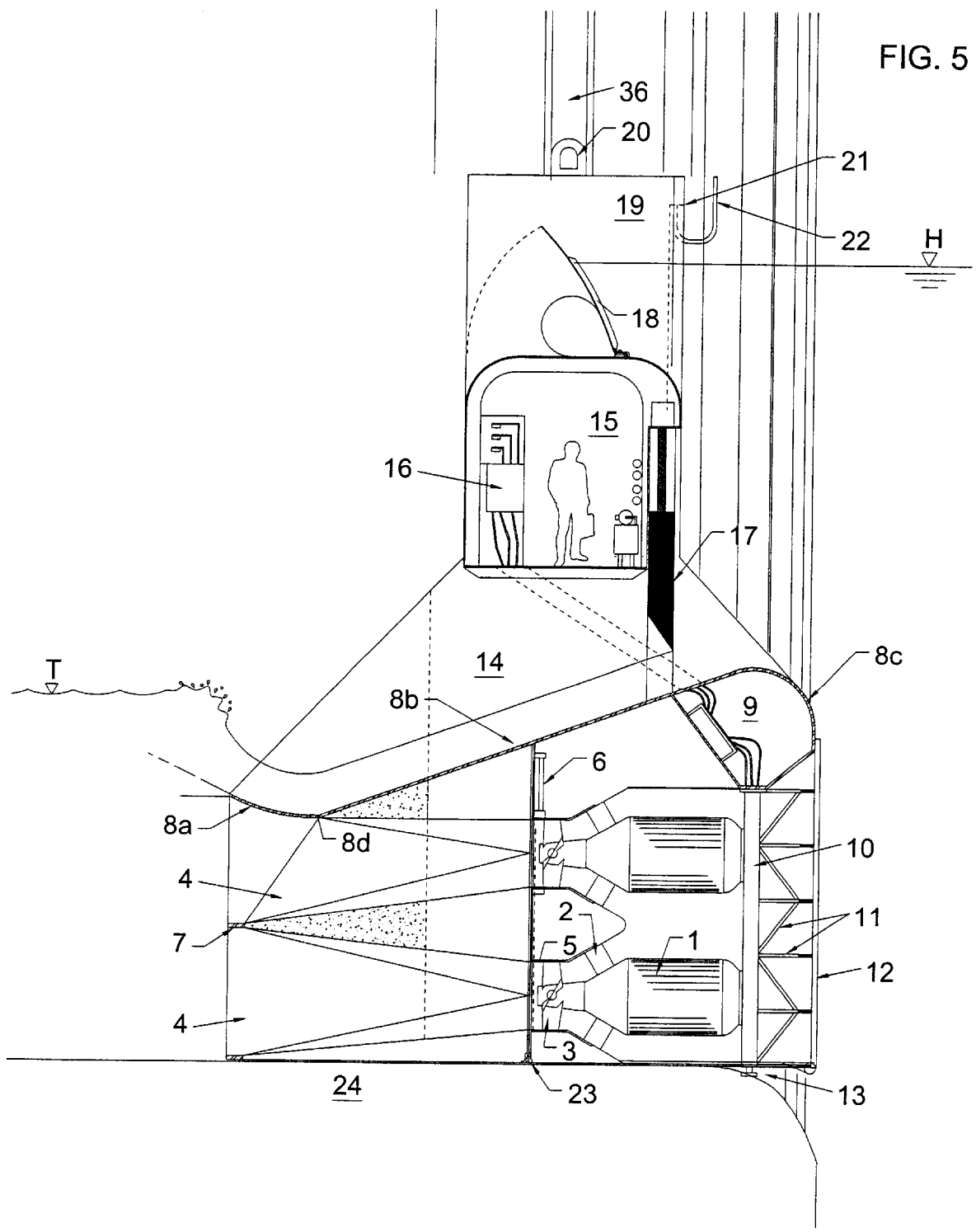
FIG. 5 is a detailed cross section of the module depicted in FIG. 4.(including draft tubes 4, runner 3, guide vanes 2 and turbine generator 1.
Figure 6:
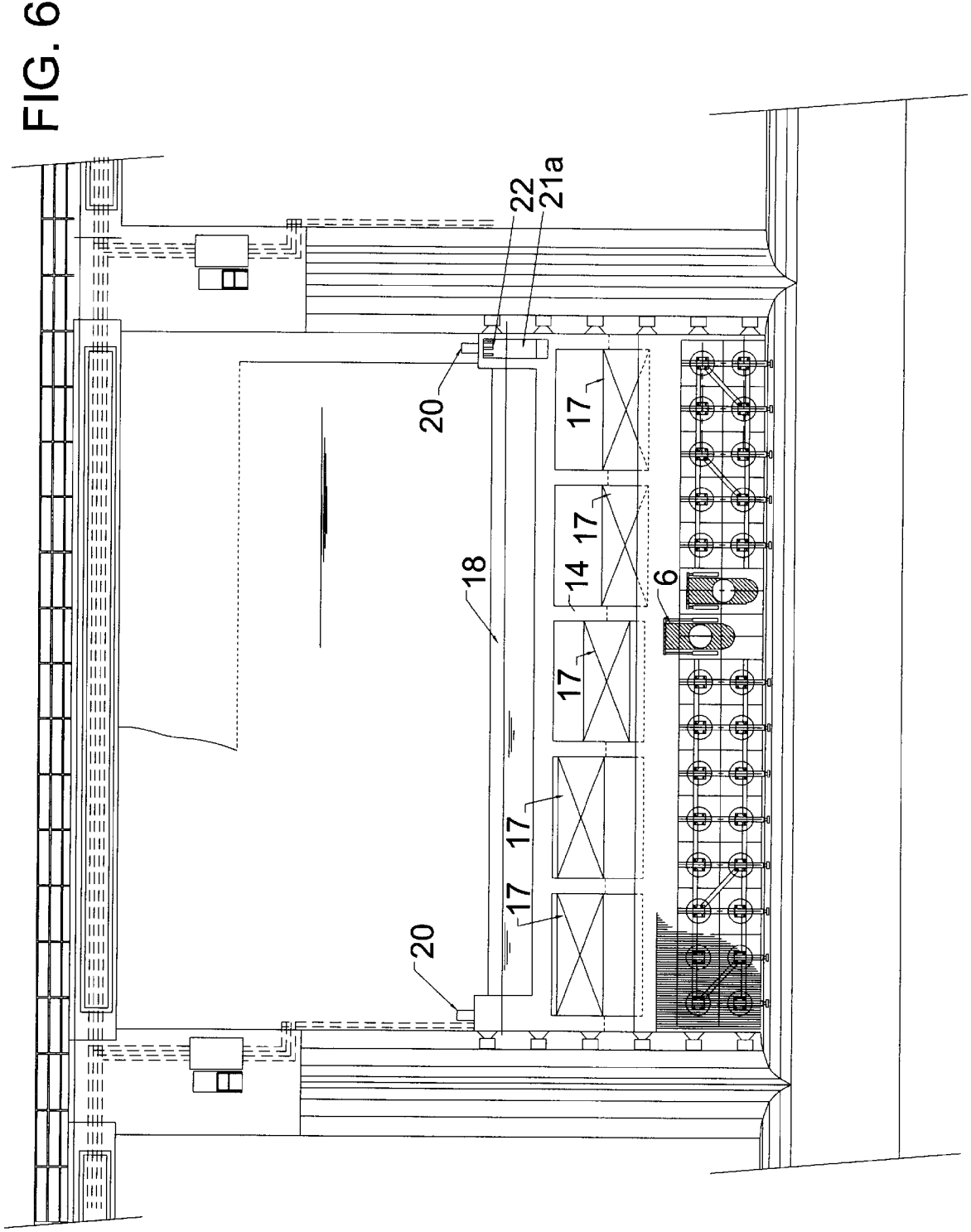
FIG. 6 is a view facing downstream, partially cut away, of a module in the generating position. Auxiliary roller gates as well as spillway gates are depicted.
Figure 7:
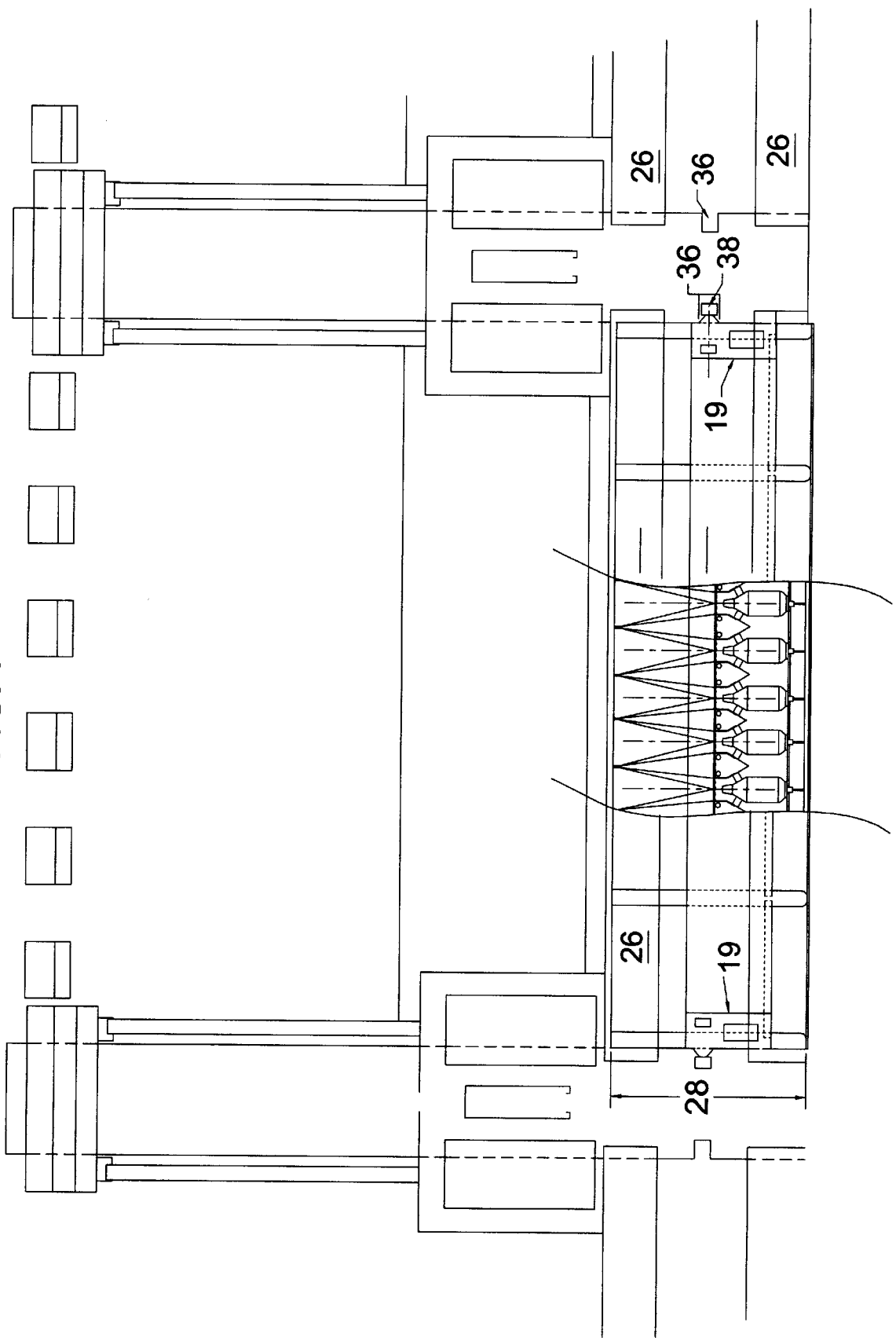
FIG. 7 is a top plan view, partially cut away, showing the position of a module in a bay.

At most installations the modules must be taken out of service and raised out of the flow path due to seasonal and storm related flow increases. This may significantly impact annual power generation and project economics. The incorporation of waste gates 17 (FIG.5) or spillway gates 18 allows the module to pass greater total flows and to remain in operation for a greater portion of each year. The average annual number of module lifting operations is also thereby reduced. Careful configuration of the waste gate 17 and it's spillway 8b can reduce the effective tailwater elevation and increase turbine output by recovering a portion of the energy in the waste flow. Referring to FIG. 5, efficient energy recovery requires a smooth approach 8c to the waste gate 17 followed by a smooth spillway surface 8b and terminating at a draft tube lip 8a. The energy benefit is derived from the conservation of momentum of the combined waste and turbine flows and from the waste stream acting as an extended diffuser surface for the underlying turbine flow. The low point 8d of the draft tube lip 8a provides the further benefit of allowing the draft tube to seal against air incursion under low tailwater conditions. The tailwater elevation is designated by the letter "T." The headwater elevation is designated by the letter "H". An additional benefit of the waste gate approach surface 8c is that it forms a portion of a horizontal cable way 9 which provides support to the turbine assemblies and facilitates electrical connection of the generators 1.

Figure 9:
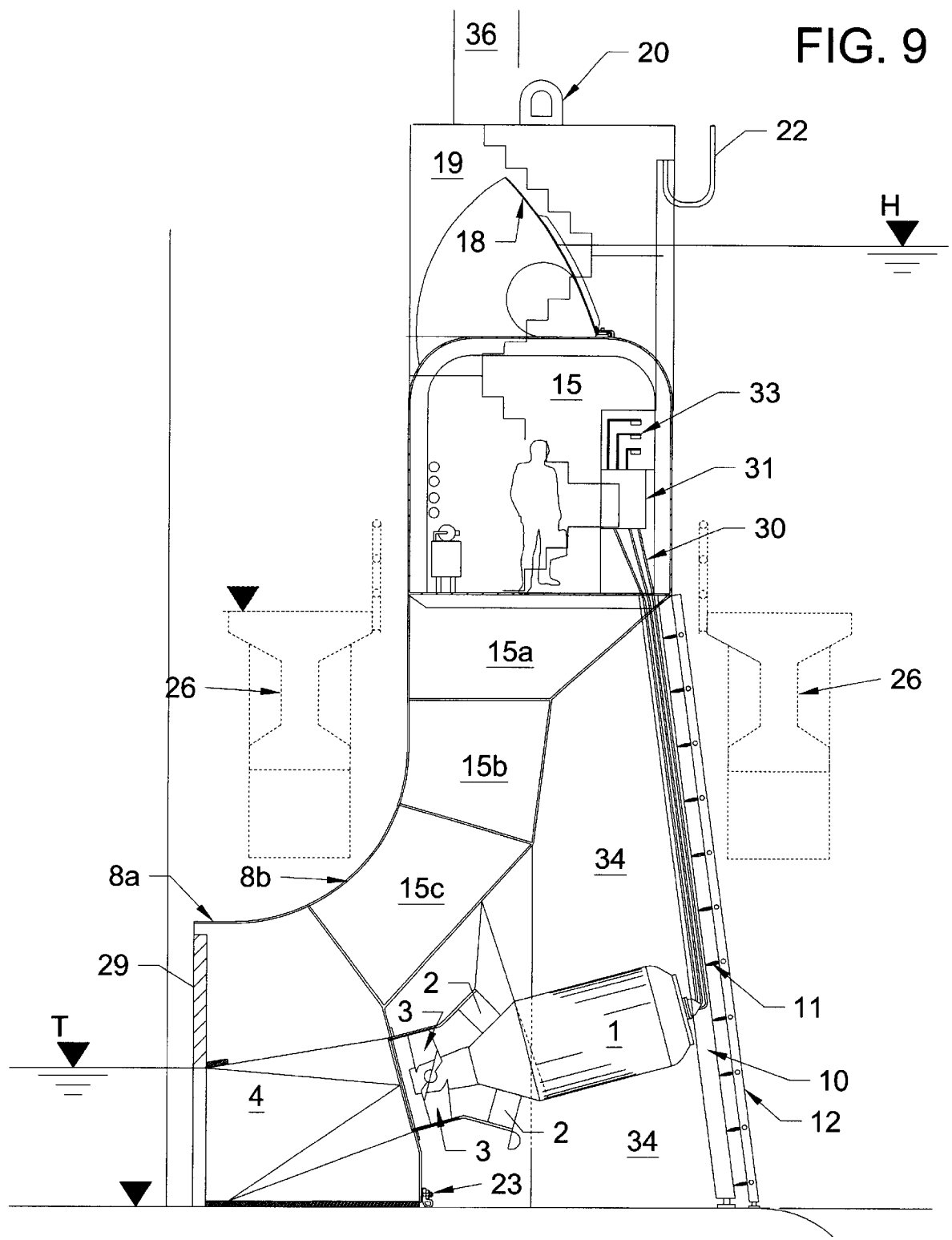
FIG. 9 is a sectional elevational view of the module shown in FIG. 8.

Referring to FIG. 5, there is shown a tubular structural support or column 10 extending from the cable duct 9 or from the equipment hallway 15 in FIG. 9. An upstream trash screen 12 and trash screen support members 11 are shown in FIGS. 5 and 9. At the bottom of the support column 10 there may be a bearing pad 13 for transmitting loads to sill 24 which is preferably height adjustable.

Waste gate piers 14 provide a structural connection between draft tubes 4, cable way 9, and switch gear hallway 15. A vertical columnar structure 19 is provided at each end of the module 28 to provide access to the module from each end, to provide a lifting point, and to provide access and mounting means for retractable bulkhead slot wheels or guide means 38. A lifting lug or crane attachment means 20 is secured to each column 19. A cable attachment or feed-through point 21 and associated recess 21a in column 19 facilitate proper drooping of electrical cables 22 when the module 28 is raised.

FIG. 9 also shows a seal 23 across the bottom of the module 28 extending from pier to pier so as to balance the buoyancy and down-pull forces during use of the turbine module as an emergency closure device. Preferably, the seal is configured so as to provide a distinct and stable flow separation edge. FIG. 9 also shows turbine generator sets comprising generator 1, guide vanes 2, and runner 3 attached to a bulkhead assembly comprising access columns 19, lifting points 20, horizontal tubular structures 15, 15a, 15b and 15c, and draft tubes 4.

Figure 9A:
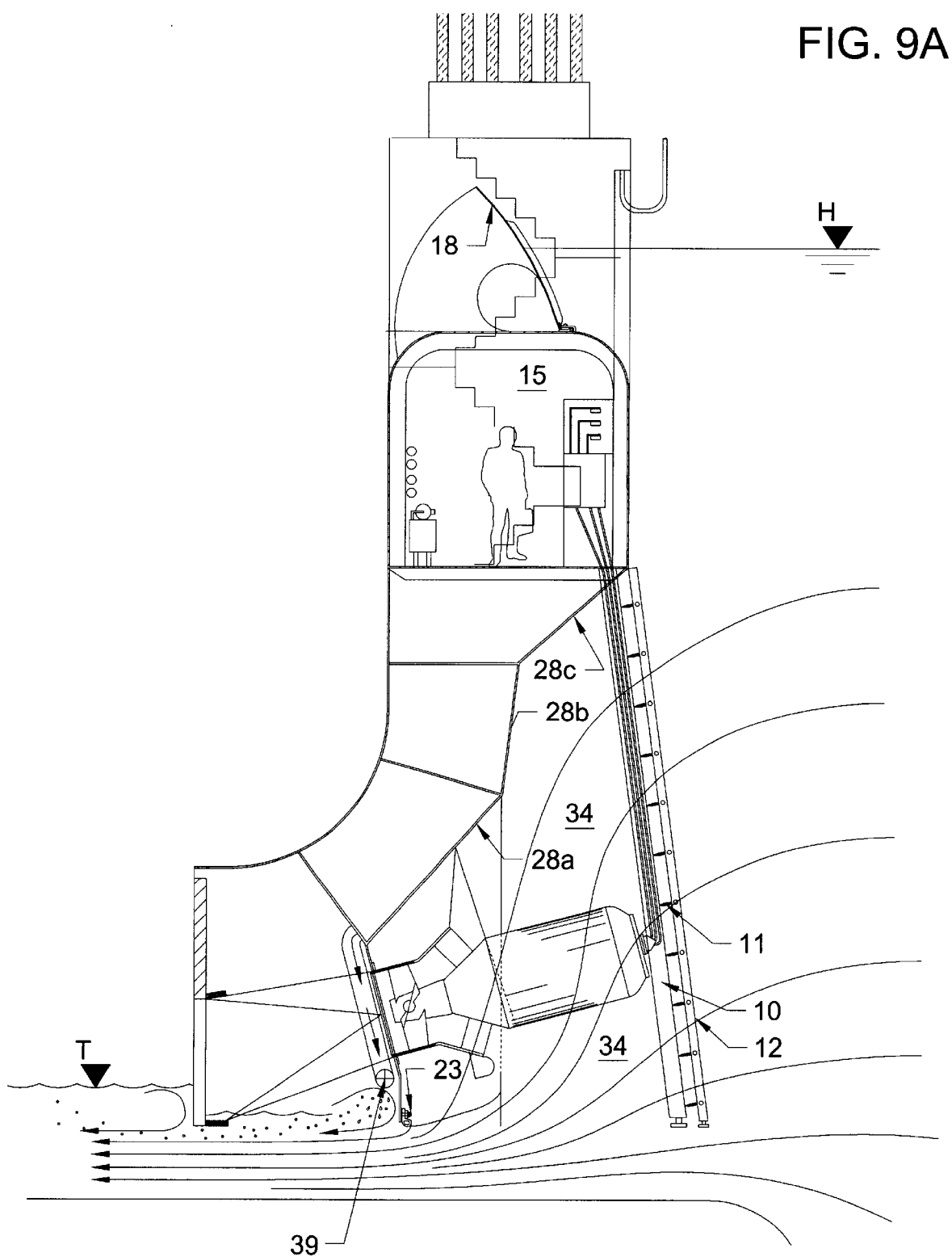
FIG. 9A is a sectional elevational view of the module of FIG. 9 being lowered as an emergency shut-off device.
Figure 10:
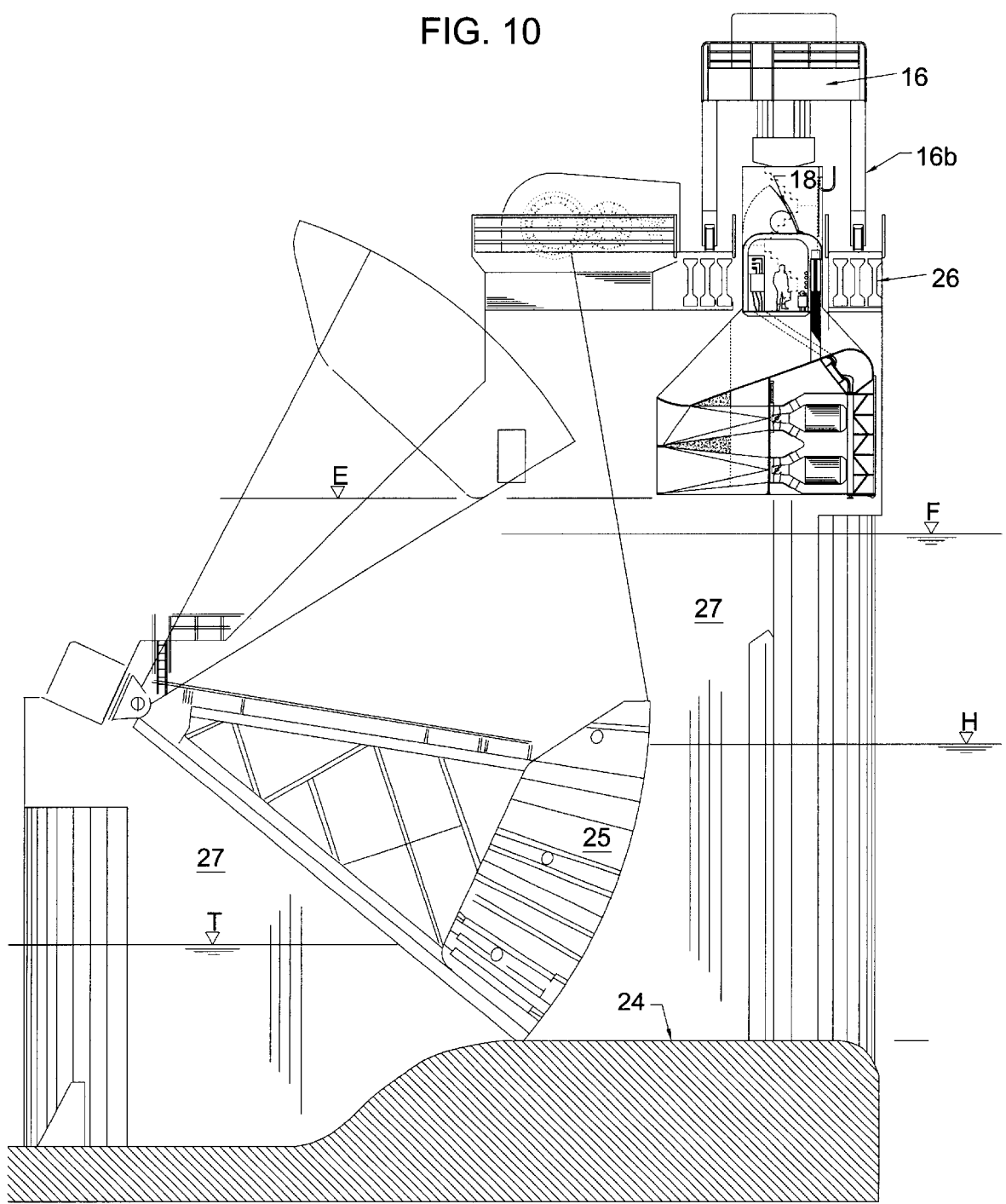
FIG. 10 is a sectional elevation of a module in the raised position showing the modified bulkhead service crane.

FIG. 9A shows the module being lowered into position as an emergency shut-off device. Flow lines illustrate the manner in which water flows through the trash screen and beneath the module resulting in a stable flow separation edge at seal 23 without significant down-pull forces under the upstream portion of the module as is represented by the nearly full headwater pressure acting on module surfaces 28a, 28b and 28c. Air vent 39 prevents the detrimental formation of a vacuum downstream from seal edge 23.

As illustrated in FIG. 9, the preferred method of electrical connection in the case of submerged individual generators is by means of wires 30 extending through support column 10 to circuit breaker 31 connected to bus bars 33 connected through access column 19 to cables 22.

Figure 11:
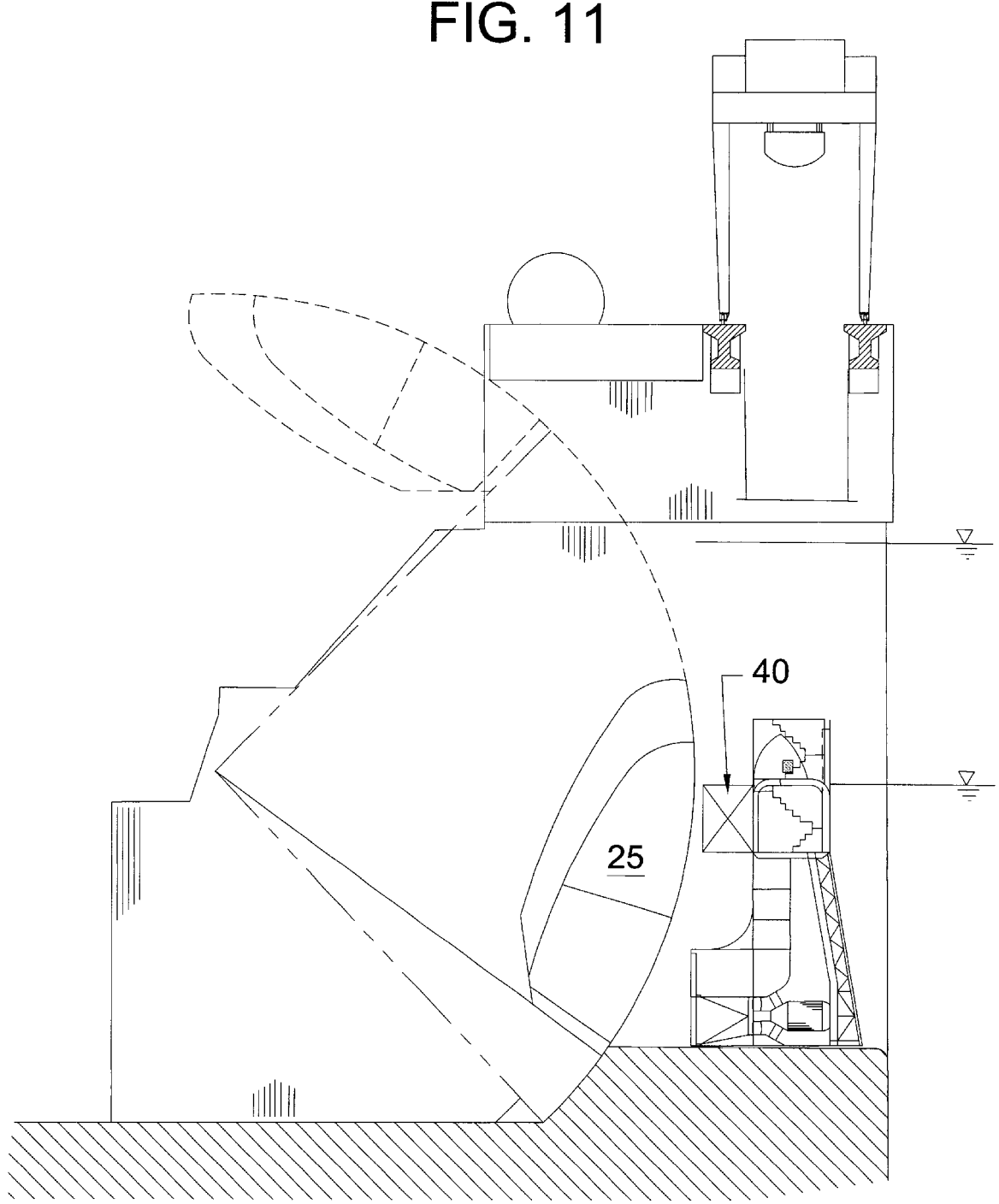
FIG. 11 depicts a bumper arrangement for transferring impact loads from the generating module to the radial gate.

FIG. 11 shows a generating module in operating position incorporating a load-transfer frame 40 designed to limit deflection of the module in case of impact by a barge, for example. One or more load-transfer devices may be spaced along the length of each module. In the event of a large object striking the module, the load-transfer device 40 operates as a bumper to transfer the force to the radial gate 25 and thereby prevent damage to the module which could prevent raising the module or moving the radial gate.

At some projects impact of loose uncontrolled shipping barges against the installed modules is a design consideration. As described above in connection with FIG. 11, a bumper or load-transfer device 40 may be incorporated into the module structure in order to transfer loads to the radial gate at predetermined locations during such an event. Such a bumper could alternatively be attached to the radial gate 25. It should be noted that the term "radial gate" is used for convenience because most of the potential structures for the herein described installation utilize mostly radial gates. Other types of preexisting gates downstream of the bulkhead slots may be utilized in an equivalent manner and the claims referring to radial gates are intended to be interpreted broadly to include other gates of equivalent function.

A critical aspect of module hydraulic design is the elimination of any horizontal surfaces at a low elevation near the upstream end of the module. With flow under the module, such surfaces would be subject to approximately the full differential between headwater and tailwater. Such a surface 12 feet long ×100 feet wide under 20 feet of head would be subject to a down pull of approximately 750 tons. This figure must be added to a module weight of perhaps 400 tons. The crane loads could be catastrophic under these conditions. Referring to FIG. 9A, the open bottom of the trash screen enclosure permits free flow from above toward the sealing edge 23 of the module. The bottom face of the trash screen enclosure 34 may alternatively be covered with an expendable or articulated cover or with a trash screen.

Referring to FIG. 9, water flow through the individual turbines may be started and stopped by means of a slide gate 29 or fixed wheel gate at the downstream end of each draft tube or vertical column of draft tubes. Each such draft tube gate is preferably operated by one or more hydraulic cylinders located inside of or along side of the gate to provide an unobstructed water and debris flow path above. Either the cylinder or the rod may be configured to move with the gate.

Figure 8:
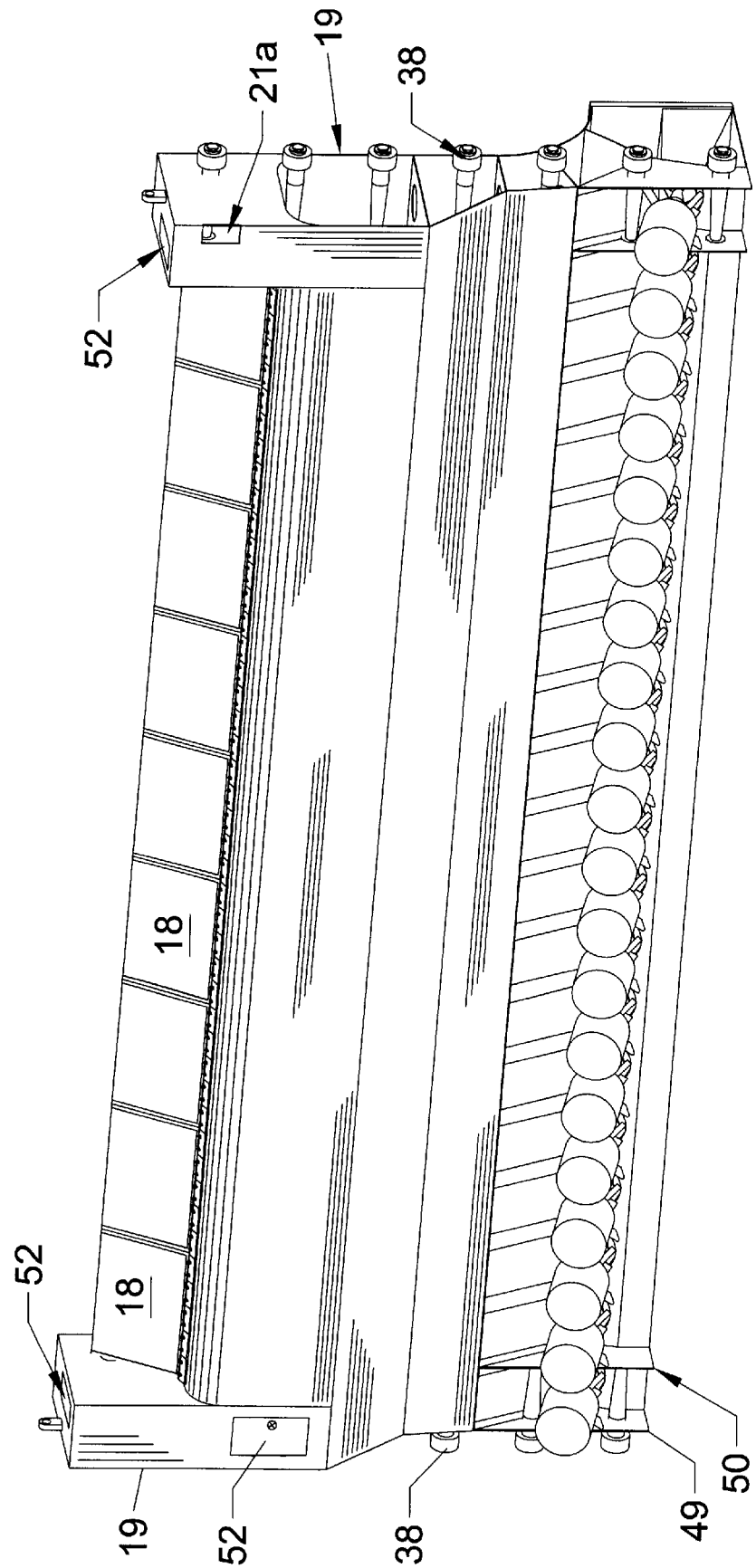
FIG. 8 is a perspective view, partially cut away and without the trash screen assembly, of the upstream face of a module. Pre-existing crane girders 26 are shown in dotted lines for reference purposes relative to the position of the module when raised.

Referring to FIG. 8 the sides 49 and 50 of the access column 19 are extended downward to secure the lowermost wheel assemblies 38, while allowing water flow to the outermost turbine situated between sides 49 and 50. Access doors 52 are provided on the top and downstream faces of the module.

Figure 12:
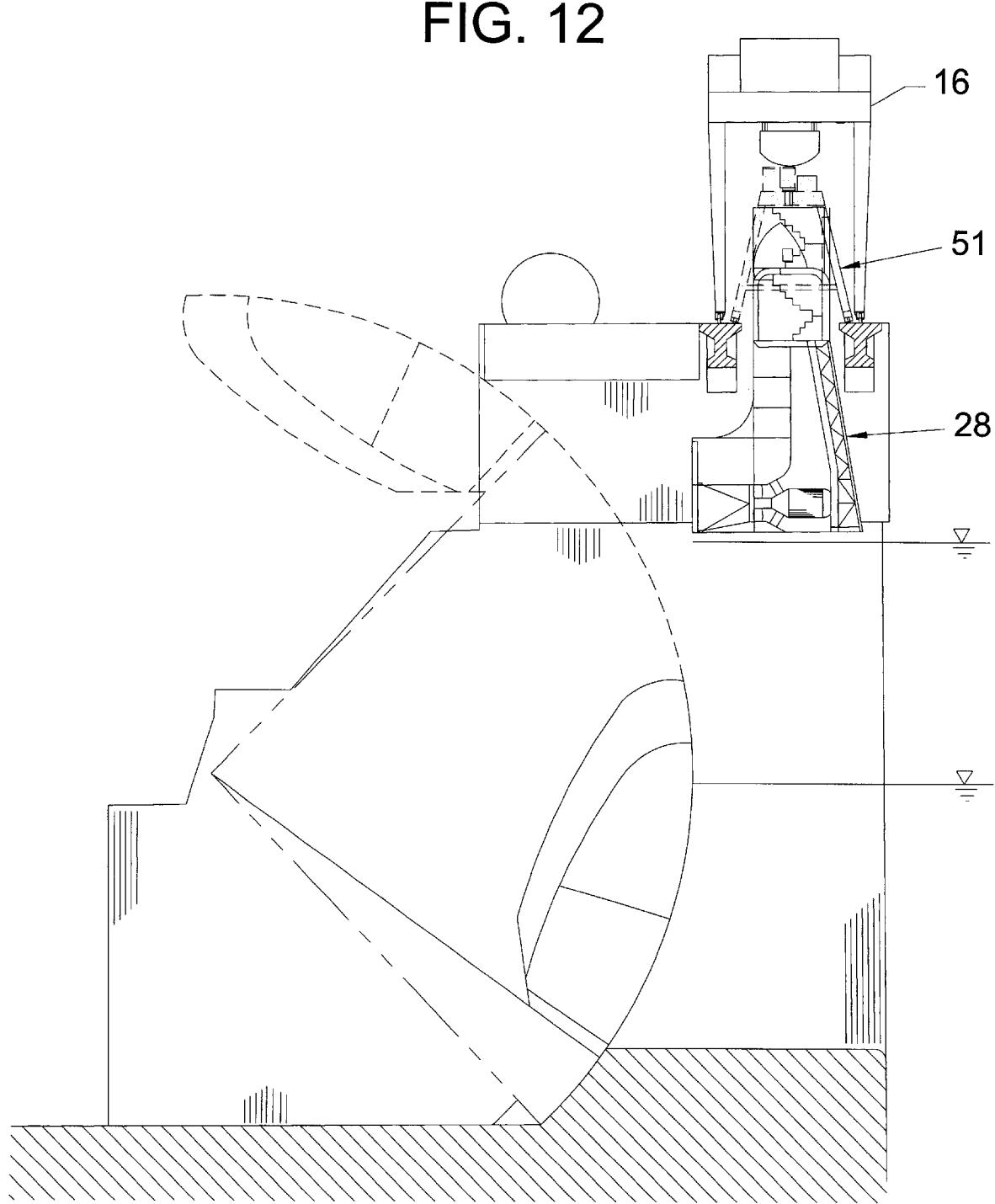
FIG. 12 shows a module in the raised position in association with an emergency lifting device and the bulkhead service crane.
Figure 13:
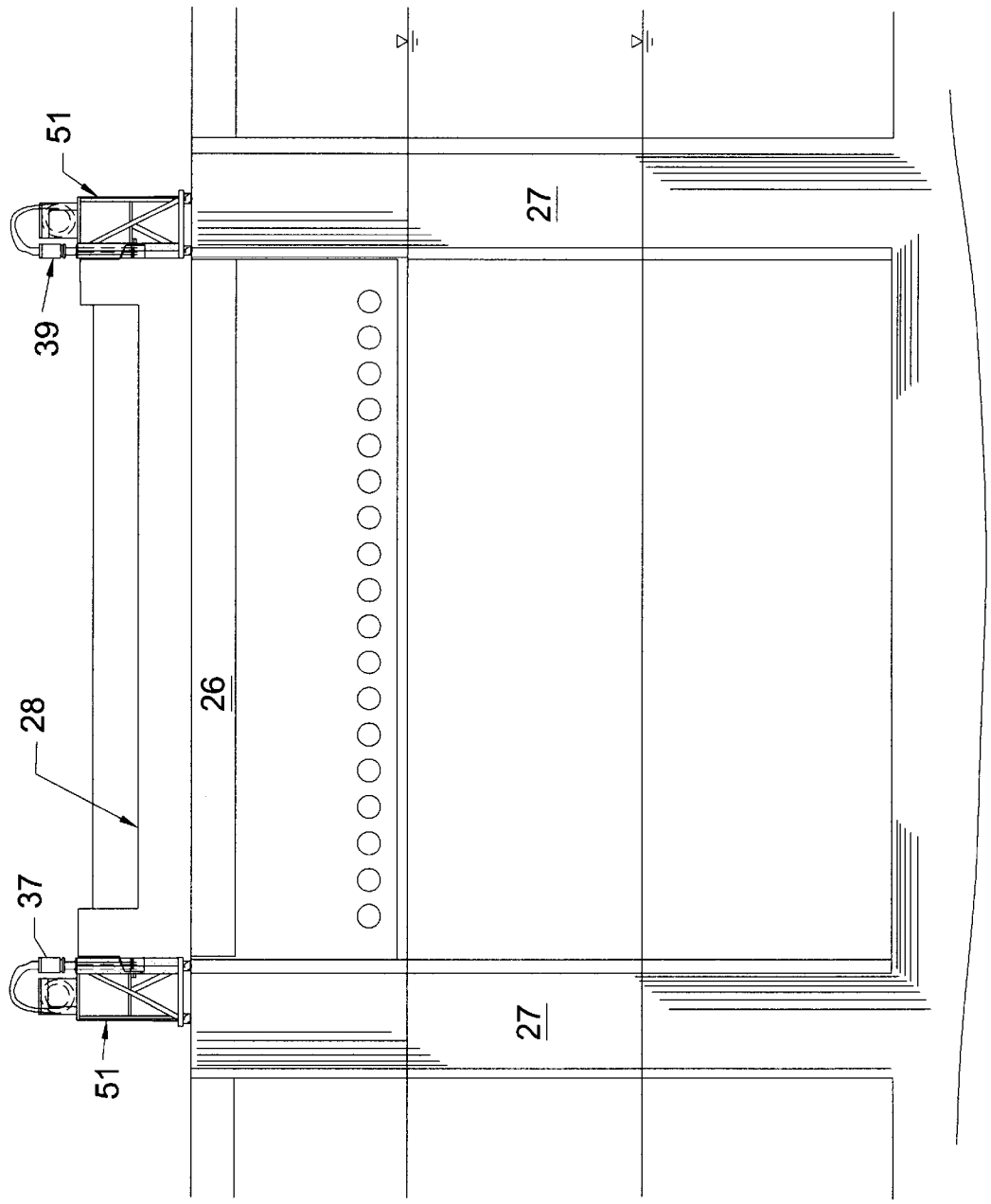
FIG. 13 shows an emergency lifting device positioned at each end of a raised module.
Figure 14:
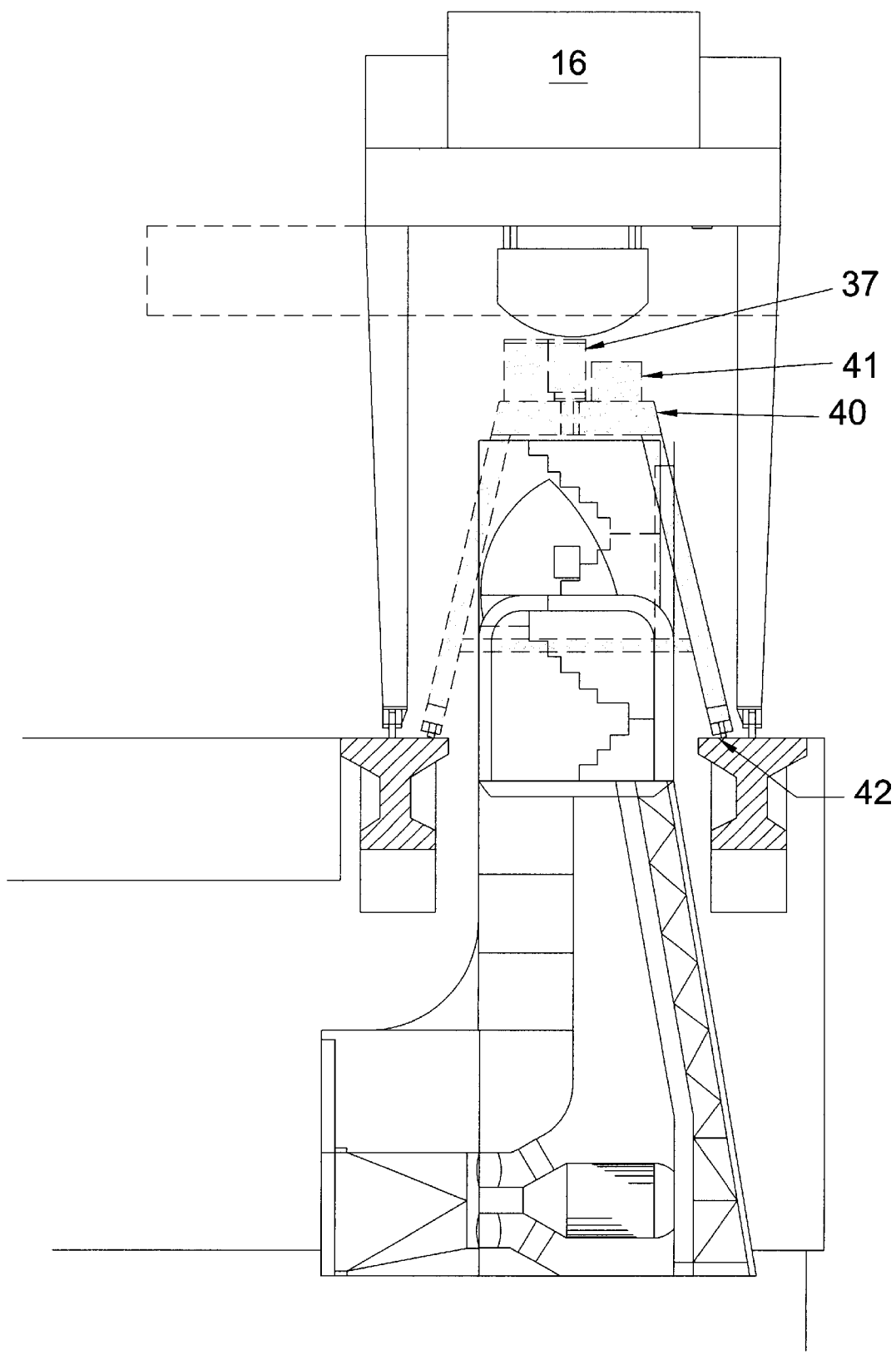
FIG. 14 is a sectional elevation view showing a raised module in association with the emergency lifting device and the bulkhead service crane.
Figure 15:
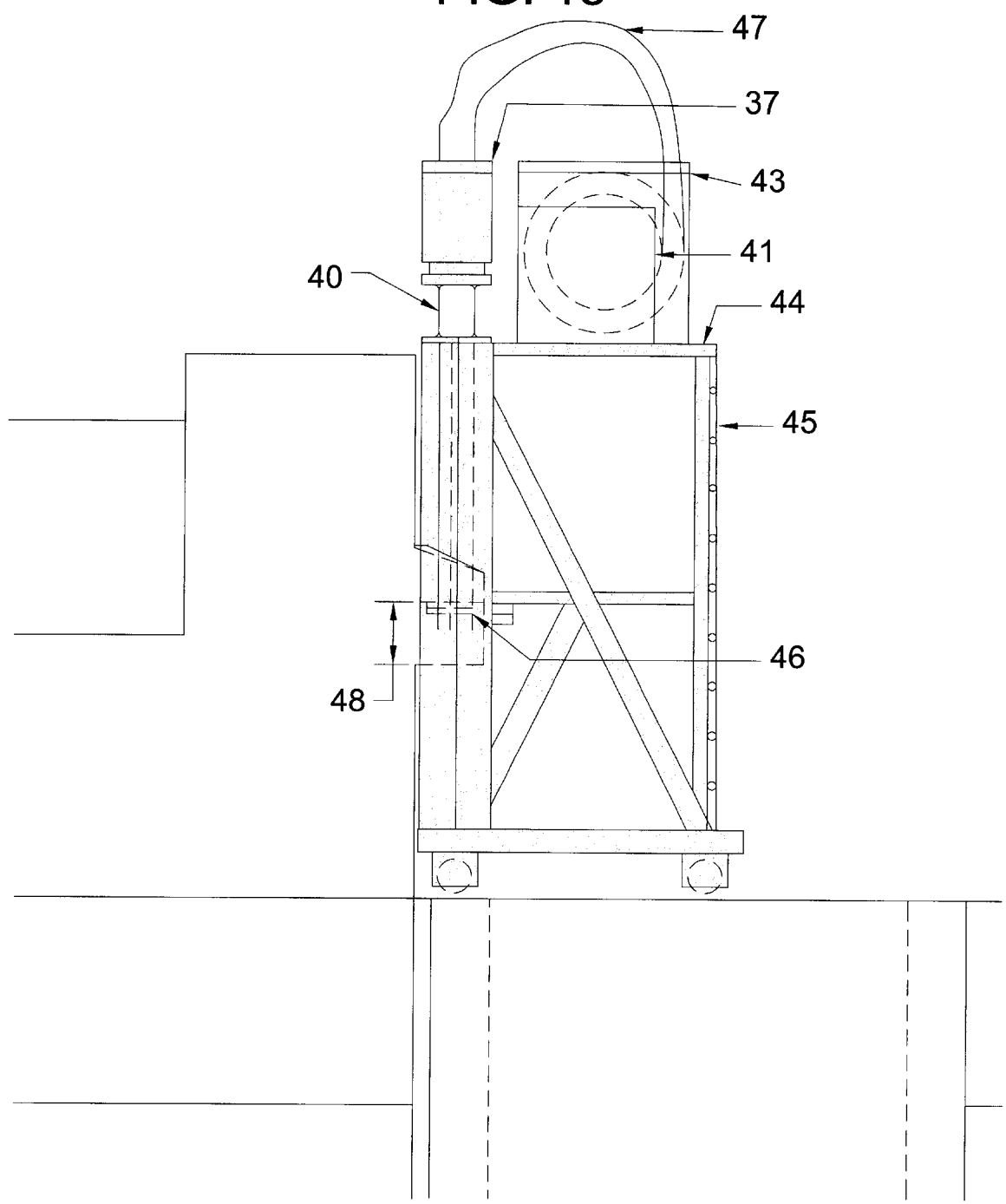
FIG. 15 is an elevational view of one of the emergency lifting devices.

In FIG. 12 there is shown a module 28 in the raised position. Also shown in operating position is an emergency lifting device 51, positioned under the bulkhead service crane 16. In FIG. 13 there is shown an elevation view facing downstream showing the emergency lifting devices 51 in operating position with the module 28 in the fully raised position. FIG. 14 is a detailed sectional elevation view of a module 28 in the raised position. Multistrand jack 37 is mounted on jack support 40 and powered by hydraulic pump 41. The jack support travels on rails 42. Referring to FIG. 15, an elevation view parallel to water flow, multi strand jack 37 sits atop jack support 40. The device 43 for winding the strands is shown along with the hydraulic pump 41 mounted to working platform 44 which may be accessed by ladder 45. Located below the multi strand jack 37 is the connector 46 for the lifting strands 47. The connector 46 is accessed through opening 48.

Figure 16:
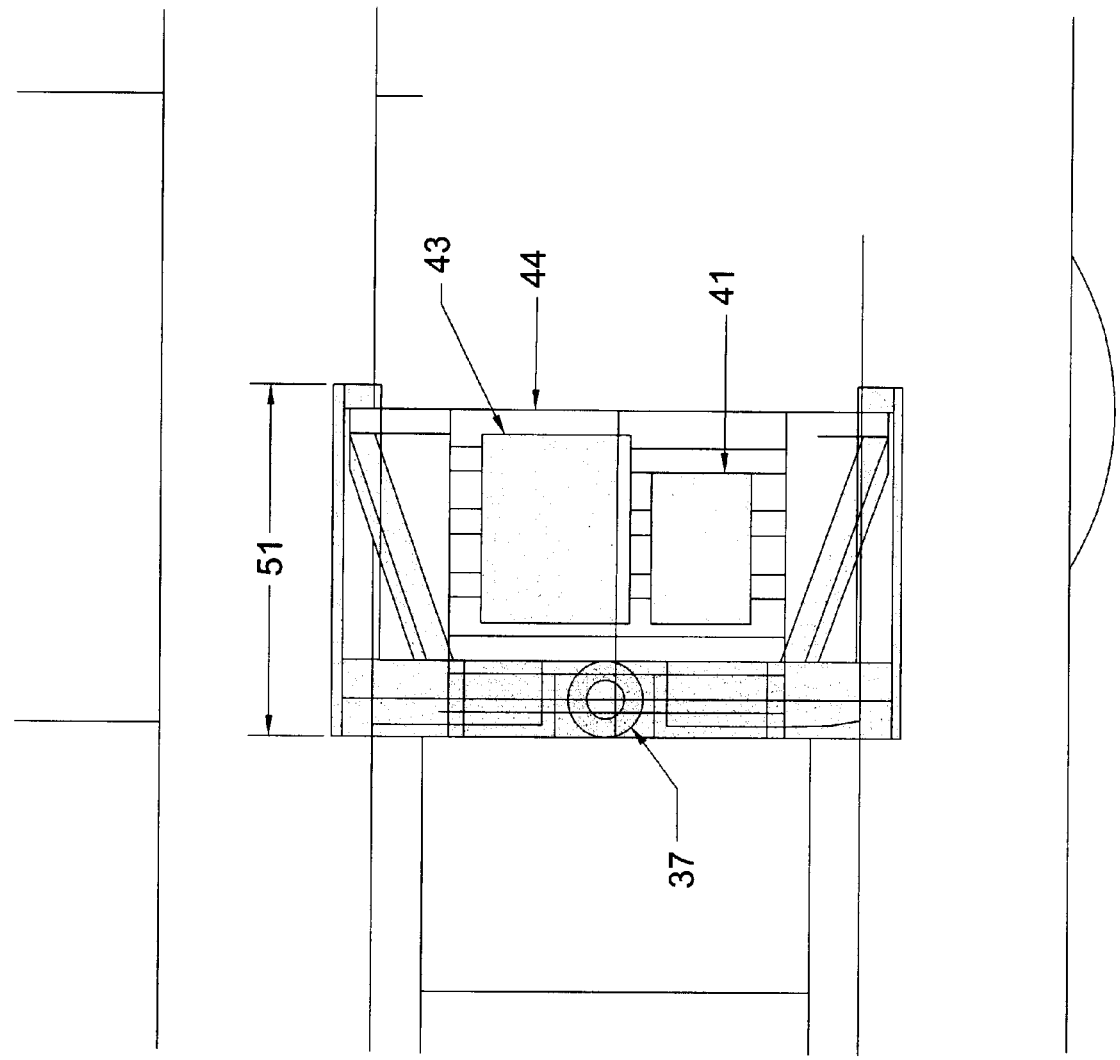
FIG. 16 is a plan view of one of the emergency lifting devices.

Referring to FIG. 16, there is shown a top view of the emergency lifting device 51, and the device 43 for winding the strands.

Figure 17:
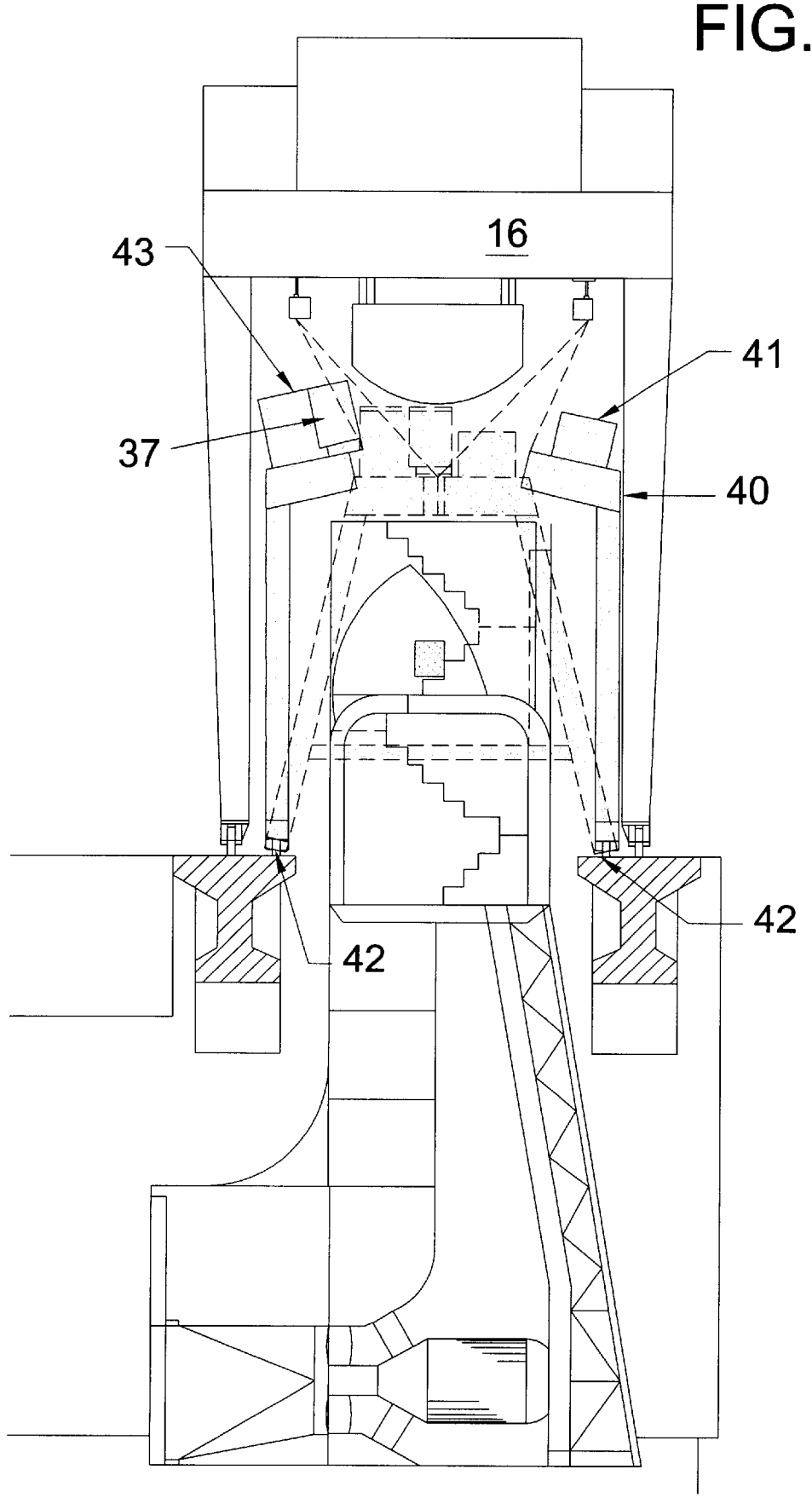
FIG. 17 is a sectional elevation view showing an emergency lifting device re-configured to pass under the bulkhead service crane.

Referring to FIG. 17, an emergency lifting device is shown reconfigured to allow it to pass under the bulkhead service crane 16. The multi strand jack 37 is shown adjacent to the device 43 for winding the strands 47. The hydraulic pump 41 is shown on a separated portion of the jack support 40. Each separated portion of the support remains on rails 42.

Other variants are possible without departing from the scope of this invention.

What is claimed is:

1. A combination comprising:
   (a) a gated dam structure including (1) spaced-apart vertical piers, (2) opposing vertical slots in said piers, (3) a spillway sill extending between said piers, (4) spaced-apart crane girders extending between said piers, and (5) a single crane supported on said crane girders; and
   (b) a generating module comprising a plurality of hydromotive machines, and draft tubes extending downstream from said hydromotive machines, wherein said module includes guide means positioned within said vertical slots, and wherein said module further includes lifting points, attachable to said service crane for enabling said service crane to raise and lower said generating module relative to said spillway sill.

2. The combination of claim 1, wherein said generating module comprises at least one closed horizontal tubular structure above said draft tubes.

3. The combination of claim 2 wherein said generating module includes a lower edge, and wherein said lower edge includes a seal extending between said piers to provide a stable flow separation edge, and wherein said generating module further includes air ventilation downstream of said seal.

4. The combination of claim 3 wherein said generating module permits downward flow from the area upstream of the seal.

5. A combination in accordance with claim 2, wherein said service crane is adapted to move said generating module between raised and lowered positions; wherein when said generating module is in said lowered position it rests on said spillway sill, and wherein when said generating module is in said raised position said horizontal tubular structure is located between said crane girders.

6. The combination of any of the claims 2 or 1 wherein said generating module includes an upstream edge which controls water flow when the module is used as a shut-off device.

7. The combination of claim 1 further comprising an emergency lifting means which is transportable by said service crane.

8. The combination of claim 1 wherein the emergency lifting means is adapted to be separated to pass through the service crane.

9. A combination in accordance with claim 1, further comprising a movable slide gate for controlling water flow through said draft tubes.

10. The combination of either claims 2 or 1 wherein said generating module includes a spillway portion above said draft tubes.

11. The combination of claim 10 wherein said spillway portion is controlled by vertically adjustable spillway gates.

12. The combination of any of claims 2 or 1 wherein said generating module further comprises vertical tubular structures for providing mechanical support to the hydromotive machines and a water tight enclosure for either electrical or mechanical power transmission upward.

13. The combination of claim 12 further comprising a trash screen, wherein said trash screen is supported by said tubular structures.

14. The combination of claim 12 wherein said tubular structures bear against said spillway sill.

15. The combination of claim 14 wherein said tubular structures include an adjustable bearing pad means for transmitting loads to said spillway sill.

16. The combination of claims 7 or 8 wherein the emergency lifting means is a hydraulic strand jack system.

17. A combination comprising;

(a) a gated dam structure including (1) spaced-apart vertical piers, (2) opposing vertical slots in said piers, (3) a spillway sill extending between said piers, (4) spaced-apart crane girders extending between said piers and having a bottom edge, and (5) a service crane system supported on said crane girders; and (b) a generating module comprising a plurality of hydromotive machines, and draft tubes extending downstream from said hydromotive machines, wherein said module includes guide means positioned within said vertical slots, a closed horizontal tubular structure above said draft tubes, and wherein said module further includes lifting points, attachable to said service crane system for enabling said service crane system to raise and lower said generating module relative to said spillway sill, wherein when said generating module is in a raised position said closed horizontal tubular structure is as high as said bottom edge of said crane girders.

* * * * *